US006186376B1

United States Patent
Hyun

(10) Patent No.: US 6,186,376 B1
(45) Date of Patent: Feb. 13, 2001

(54) GARMENT HANGING DEVICE

(76) Inventor: Peter Hyun, 344 B. Boulevard, Hasbrouck Heights, NJ (US) 07602

( * ) Notice: Under 35 U.S.C. 154(b), the term of this patent shall be extended for 0 days.

(21) Appl. No.: 09/322,090

(22) Filed: May 28, 1999

(51) Int. Cl.$^7$ ............................................. A47G 25/14
(52) U.S. Cl. ............................ 223/1; 224/927; 224/313
(58) Field of Search ................................. 224/927, 313; 211/119, 181; 223/DIG. 1, 85, 1

(56) References Cited

U.S. PATENT DOCUMENTS

| D. 337,209 | 7/1993 | Cardinal et al. | D6/317 |
|---|---|---|---|
| 4,523,701 | 6/1985 | Armbruster | 223/94 |
| 4,664,267 | 5/1987 | Clark | 211/94 |
| 4,872,568 | * 10/1989 | Lehman | 223/85 |
| 4,893,715 | * 1/1990 | Papazian | 211/118 |
| 4,961,557 | * 10/1990 | Garvin | 248/318 |
| 5,018,694 | * 5/1991 | Olson | 248/340 |
| 5,100,008 | * 3/1992 | O'Herron | 211/106 |
| 5,328,068 | 7/1994 | Shannon | 224/42.46 |
| 5,373,979 | 12/1994 | Moore | 224/42.46 |
| 5,398,984 | 3/1995 | Elder | 294/142 |
| 5,836,486 | * 11/1998 | Ohsugi | 223/DIG. 4 |
| 5,904,278 | * 5/1999 | Barlow | 223/DIG. 4 |

* cited by examiner

Primary Examiner—Bibhu Mohanty
(74) Attorney, Agent, or Firm—Goldstein & Canino

(57) ABSTRACT

A clothes hanging device, for supporting a garment in a vehicle, from grab handles located in the vehicle interior near the ceiling. The hanging device comprises a pair of hooks and a bow. The bow has a horizontal member having pair of ends, and a having pair of downwardly and outwardly sloping members. Each of the downwardly and outwardly sloping members connects one of the ends of the horizontal member with one of the hooks. The bow supports a garment, and the hooks engage the grab handle to support the garment therefrom. The bow is substantially planar, and the hooks are twisted outward therefrom so as to extend over the grab handle to support the bow substantially parallel to the grab handle, and parallel to the vehicle window.

1 Claim, 1 Drawing Sheet

GARMENT HANGING DEVICE

BACKGROUND OF THE INVENTION

The invention relates to a garment hanging device. More particularly, the invention relates a garment hanger which is configured so that it may be easily supported by the grab handles typically mounted near the ceiling in many automobiles.

It is quite common that clothing must be transported by automobile. Most of the time, dry cleaning is picked up by automobile Further, certain occasions require that, a suit or dress must often accompany the occupants of the vehicle. Keeping the suit or dress well-pressed during the journey is a difficult task.

Traditionally most vehicles had a small hanging hook at the rear of the driver's and/or passenger's sides, to support conventional hangers. However, many modern vehicles, especially sport utility vehicles and foreign automobiles, have eliminated these hooks and replaced them with "grab handles". These grab handles are typically located just adjacent to the ceiling, above the front and/or rear doors.

Thus, when one is transporting fine clothing by automobile, the only option is to hang the clothes from the grab handles with hangers that extend directly over and through the grab handles. Due to the design and location of these grab handles in relationship to the ceiling of the vehicle, it is often difficult, and on some vehicles impossible, to pass the hook of the conventional clothes hanger through the opening between the grab handle and the ceiling (headliner) of the vehicle in which it is attached. Also, during the installation and removal of the conventional clothes hangers from the grab handle, the clothes hangers, especially the ones made of wire, will sometimes scrape, damage, or tear the vinyl and leather material from which the grab handles are made and also the vinyl or cloth material from which the ceiling or headliner is made. The direct contact and sliding movement of the conventional clothes hangers against the surfaces of the grab handle also has a tendency to wear, tear, crack, and damage the grab handles. For these reasons, many vehicle owners will not hang clothes directly over and on the grab handles in the vehicles.

Even if the vehicle owner does place conventional clothes hangers on the grab handles, the garments tend to be pushed against the windows and doors of the vehicle, due to the position of the grab handle in the vehicle, thus wrinkling and possibly soiling the garments. Since the garments hang perpendicular to the grab handle and parallel to the back for the vehicle, they also have a tendency to obstruct a good portion of the driver's view through the rear window of the vehicle and limit the useful seating capacity of the back seat.

Others have proposed devices which attach onto the grab handles of a vehicle, for the purpose of hanging a single garment, or multiple garments. While these units may be suitable for the particular purpose employed, or for general use, they would not be as suitable for the purposes of the present invention as disclosed hereafter.

SUMMARY OF THE INVENTION

It is an object of the invention to produce a garment hanging device which is adapted to be supported by a grab handle in a vehicle, for then supporting a garment therefrom. Accordingly a pair of hooks engage the grab bar, and a bow supports the garment.

It is another object of the invention to produce a garment hanging device which is simple in construction, so as to be inexpensive to manufacture. Accordingly, a one piece article is presented, which may be constructed from a single piece of a rod-like material, which is simply bent in key locations to form the hooks and bow.

It is another object of the invention to support the garment immediately beneath the grab handle, and parallel thereto. Thus, the garment is supported parallel to the vehicle window. Accordingly, the handles engage the grab handle such that the bow is kept parallel to the window.

The invention is a clothes hanging device, for supporting a garment in a vehicle, from grab handles located in the vehicle interior near the ceiling. The hanging device comprises a pair of hooks and a bow. The bow has a horizontal member having pair of ends, and a having pair of downwardly and outwardly sloping members. Each of the downwardly and outwardly sloping members connects one of the ends of the horizontal member with one of the hooks. The bow supports a garment, and the hooks engage the grab handle to support the garment therefrom. The bow is substantially planar, and the hooks are twisted outward therefrom so as to extend over the grab handle to support the bow substantially parallel to the grab handle, and parallel to the vehicle window.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
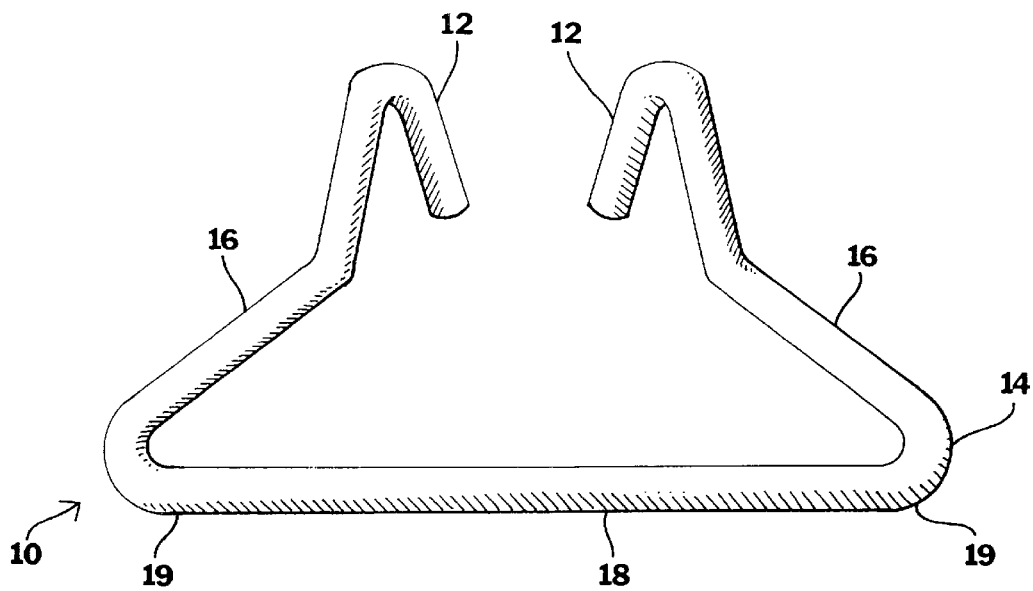
FIG. 1 is a front elevational view, illustrating a garment hanging device.

FIG. 1 illustrates a garment hanging device 10, comprising a pair of hooks 12 and a bow 14. the bow 14 comprises a pair of outwardly and downwardly sloping members 16, and a horizontal member 18. The horizontal member 18 has a pair of opposite ends 19.

Each of the outwardly and downwardly sloping members 16 connect one of the ends 19 of the horizontal member 18 with one of the hooks 12. The bow 14 is substantially planar, while the hooks 12 are twisted outward from the plane of the bow 14.

Figure 2:
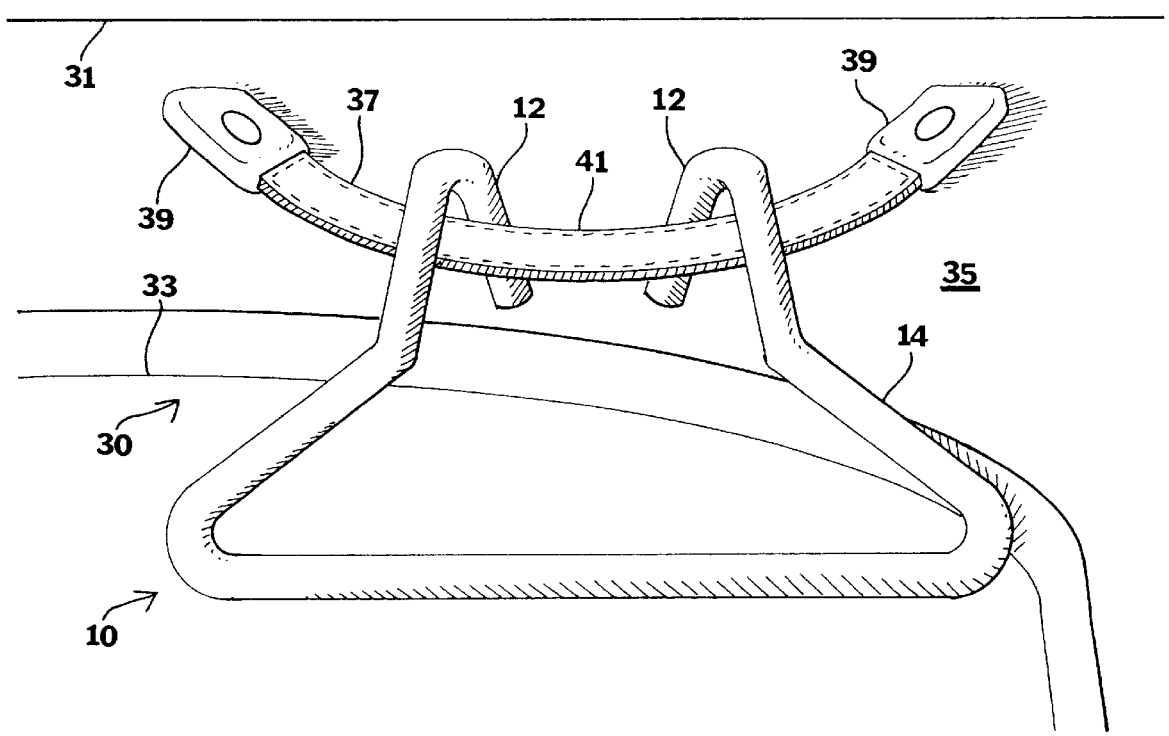
FIG. 2 is a front elevational view, illustrating the garment hanging device in use.

Referring to FIG. 2, a vehicle 30 is illustrated, having a ceiling 31, a window 33, and a sash 35 between the window 33 and ceiling 31. A grab handle 37 is mounted on the sash 35, adjacent to the ceiling 31. The grab handle 37 comprises a pair of mounting points 39, and a strap 41 extending between the mounting points 39. The strap 41 forming a convex curve between the mounting points 39.

The garment hanging device 10 is supported upon the grab handle 37, wherein the hooks 12 extend over the strap 41. The bow 14 extends substantially parallel to the strap 41, and thus substantially parallel to the window 33. Thus, any garment supported upon the bow 14 extends parallel to the window, but will not bump or scrape against the window 33.

In conclusion, herein is presented a garment hanging device which is used for supporting a garment upon a grab handle that is located in the interior of an automobile. The garment hanging device has a bow for supporting the garment, and a has pair of hooks which engage the grab handle such that the garment is supported parallel to the window.

What is claimed is:

1. A clothes hanging device, for supporting a garment by a grab handle, said device being a one-piece construction made of a single piece of material, comprising:

a pair of hooks; and a bow, comprising a pair of downwardly and outwardly sloping members and a horizontal member, the horizontal member having a pair of ends, each downwardly and outwardly sloping member connecting one of the ends of the horizontal member with one of the hooks.

* * * * *